US009375626B2

(12) United States Patent
English

(10) Patent No.: US 9,375,626 B2
(45) Date of Patent: Jun. 28, 2016

(54) ROTATABLE WEIGHT TREE

(71) Applicant: Steven E. English, Honolulu, HI (US)

(72) Inventor: Steven E. English, Honolulu, HI (US)

(*) Notice: Subject to any disclaimer, the term of this patent is extended or adjusted under 35 U.S.C. 154(b) by 0 days.

(21) Appl. No.: 14/274,579

(22) Filed: May 9, 2014

(65) Prior Publication Data

US 2015/0321044 A1    Nov. 12, 2015

(51) Int. Cl.
| F16M 11/08 | (2006.01) |
| A63B 71/00 | (2006.01) |
| A47B 49/00 | (2006.01) |
| A47B 81/00 | (2006.01) |
| A63B 21/072 | (2006.01) |
| F16M 11/00 | (2006.01) |
| A63B 21/078 | (2006.01) |

(52) U.S. Cl.
CPC ............ *A63B 71/0036* (2013.01); *A47B 49/00* (2013.01); *A47B 81/00* (2013.01); *A63B 21/072* (2013.01); *A63B 21/078* (2013.01); *F16M 11/00* (2013.01); *F16M 11/08* (2013.01)

(58) Field of Classification Search
USPC ............... 248/127, 146, 158, 176.1; 211/196, 211/197, 205, 133.4, 163, 70, 131.1, 85.7, 211/182, 195, 172, 175
See application file for complete search history.

(56) References Cited

U.S. PATENT DOCUMENTS

| 88,739 | A | * | 4/1869 | Reichenbach | 108/31 |
| 410,175 | A | * | 9/1889 | McAlister | 223/106 |
| 1,490,650 | A | * | 4/1924 | Wagner | A47G 7/041 248/170 |
| 3,382,356 | A | * | 5/1968 | Eyth | 362/270 |
| 3,421,762 | A | * | 1/1969 | Paradise | 273/339 |
| 4,889,246 | A | * | 12/1989 | Lee | 211/163 |
| 5,609,047 | A | * | 3/1997 | Hellman et al. | 68/222 |
| 5,819,961 | A | * | 10/1998 | Harris | 211/196 |
| 5,996,819 | A | * | 12/1999 | Klein | 211/85.14 |
| 6,135,480 | A | * | 10/2000 | James | 280/304.1 |
| D450,474 | S | * | 11/2001 | Sokoloff | D6/415 |
| 7,445,184 | B1 | * | 11/2008 | Johnson | 248/176.1 |
| 8,313,066 | B2 | * | 11/2012 | Hampton et al. | 248/121 |
| 2008/0054132 | A1 | * | 3/2008 | Muncie | 248/176.1 |
| 2010/0051762 | A1 | * | 3/2010 | Felknor et al. | 248/146 |
| 2010/0181441 | A1 | * | 7/2010 | Yu | 248/121 |
| 2012/0228439 | A1 | * | 9/2012 | Hassid | 248/121 |

FOREIGN PATENT DOCUMENTS

DE      3604497 A1 *   8/1987   ............ F16M 11/26

* cited by examiner

*Primary Examiner* — Alfred J Wujciak
(74) *Attorney, Agent, or Firm* — Schwabe, Williamson & Wyatt, P.C.

(57) ABSTRACT

The present embodiments are directed to a rack adapted to support a plurality of weighted plates. Such a rack is commonly known as a "weight tree" or "plate tree" due to the extensions that branch out from the center of the rack. The embodiments described herein may feature extensions that rotate about a central vertical axis so that weight plates stored on the weight tree are easily accessible to a user. In further embodiments, the weight tree may be assembled/disassembled so that individual components of the weight tree may be elsewhere employed, such as on another weight tree or on lifting equipment (e.g., a Smith machine, bench press, squat rack, etc.) adapted to receive such components.

14 Claims, 3 Drawing Sheets

ROTATABLE WEIGHT TREE

FIELD

The present disclosure relates to a system for accommodating weight plates. More particularly, the present disclosure relates to a tree configuration for storing weight plates.

BACKGROUND

In a weight-lifting environment, a rack is typically used to store a plurality of weighted plates. Such a rack is commonly known as a "weight tree" or "plate tree" due to the extensions that branch out from the center of the rack. Typically, such weight racks are static and feature no moving parts. Further, these weight racks feature an arrangement so that the heaviest weight plates (e.g., forty-five pounds) may only be accommodated on the bottom of the rack without interfering with lighter weight plates that are stored higher up on the rack.

BRIEF DESCRIPTION OF THE DRAWINGS

The embodiments herein are illustrated by way of example and not by way of limitation in the figures of the accompanying drawings in which like references indicate similar elements.

DETAILED DESCRIPTION

Figure 1:
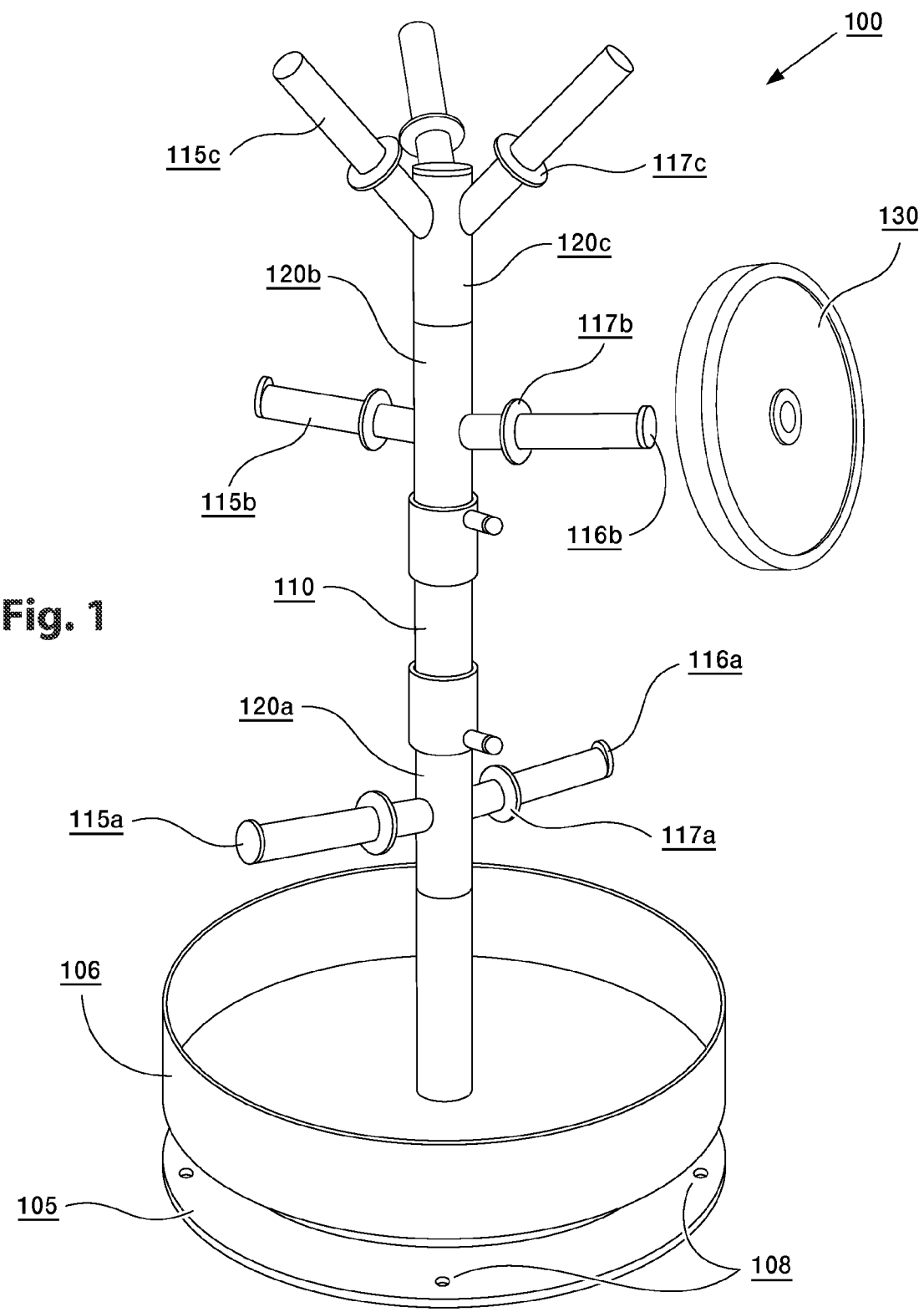
FIG. 1 is a perspective view of a weight tree for storing weight plates, according to one embodiment.

Several embodiments with reference to the appended drawings are now explained. The following description and drawings are illustrative and are not to be construed as limiting. Numerous specific details are described to provide a thorough understanding of various embodiments. However, in certain instances, well-known or conventional details are not described in order to provide a concise discussion of embodiments of the present disclosure.

Reference in the Specification to "one embodiment" or "an embodiment" means that a particular feature, structure, or characteristic described in conjunction with the embodiment can be included in at least one embodiment. The appearances of the phrase "in one embodiment" in various places in the Specification do not necessarily all refer to the same embodiment.

Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical contact. However, "coupled" may also mean that two or more elements are not in direct contact with each other, but yet still cooperate or interact with each other.

The description may use perspective-based descriptions such as up/down, back/front, and top/bottom. Such descriptions are merely used to facilitate the discussion and are not intended to restrict the application of disclosed embodiments.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

With respect to the use of any plural and/or singular terms herein, those having skill in the art can translate from the plural to the singular and/or from the singular to the plural as is appropriate to the context and/or application. The various singular/plural permutations may be expressly set forth herein for the sake of clarity.

The present embodiments are directed to a rack adapted to support a plurality of weighted plates. Such a rack is commonly known as a "weight tree" or "plate tree" due to the extensions that branch out from the center of the rack. The embodiments described herein may feature extensions that rotate about a central vertical axis so that weight plates stored on the weight tree are easily accessible to a user by rotating/spinning one or more portions of the rack. In further embodiments, the weight tree may be assembled/disassembled such that individual components of the weight tree may be elsewhere employed, such as on another weight tree or on weight-lifting equipment (e.g., a Smith machine, bench press, squat rack, etc.) adapted to receive such components.

FIG. 1 illustrates a perspective view of an embodiment of a weight tree 100 for storing weight plates. The weight tree 100 is adapted to remain relatively stable on a relatively flat surface, including surfaces that are slightly flexible or malleable (e.g., rubber flooring material commonly found in gyms and exercise studios). The weight tree 100 extends vertically upward so that a plurality of weight plates may be stored on the sides thereof. To support the weight of plates that are stored on the weight tree 100, the weight tree 100 may be constructed from at least one of steel, stainless steel, aluminum, and titanium, or any other substantially rigid material that is suitable for use as part of a weight tree, including composite materials. The perspective of FIG. 1 may therefore be regarded as a slightly elevated side perspective, although the use of "elevated side" is not to be construed as defining any features of the weight tree 100.

The weight tree 100 includes a base or supporting foundation 105 adapted to stabilize the weight tree on a flat surface. In the illustrated embodiment, the supporting foundation 105 is substantially annular in shape. However, other shapes for the supporting foundation 105 are possible and may function as satisfactorily as the illustrated annular shape. The supporting foundation 105 is substantially rigid and durable so that it will maintain its form even after significant use, such as when supporting a plurality of weight plates. In one embodiment, the inherent properties of one or more materials comprising the supporting foundation 105 provide this durability and rigidity.

The supporting foundation 105 may be adapted to be in contact with a ground surface and so may have a substantially flat lower face. Further, the lower component 105 of the supporting foundation 105 may feature a plurality of holes 108 that are adapted to receive bolts, threaded screws, or other fastening means so that the weight tree 100 may be secured to a ground surface.

In the illustrated embodiment, the supporting foundation 105 may be coupled with a tray 106. The tray 106 may not be in contact with a ground surface, and may be supported by the supporting foundation 105. The tray 106 may provide additional securing means for the weight tree 100. For example, the tray 106 may be of an appropriate weight to counterbalance centrifugal force generated when other components of the weight tree 100 are rotated. In various embodiments, the tray 106 may feature a lip or raised edge to facilitate the storage of weightlifting accessories, such as chalk or collars.

Vertically extending from the supporting foundation 105 may be a center shaft (not shown) that extends through a securing collar 110. The center shaft may not be visible according to the perspective of FIG. 1 because the center shaft may extend through the securing collar 110 and the tree components 120a, 120b, and 120c. In various embodiments, the center shaft may be coupled at its lower end with the supporting foundation 105, while the tray may be annularly disposed about the center shaft (i.e., the center shaft is disposed through an opening in the tray 106). Alternatively, the center shaft may be coupled with the tray 106 so that the tray 106 may provide coupling between the center shaft and the supporting foundation 105. The center shaft may be rotatably coupled with the supporting foundation 105 or may be rigidly coupled with the supporting foundation 105 so that the center shaft is not rotatable. In an embodiment, one of the center shaft or the supporting foundation 105 may include or may be coupled with a braking mechanism, such as a centrifugal brake, to prevent fast (and potentially unsafe) spinning of the center shaft in the supporting foundation 105. In some embodiments, the center shaft may be composed of a plurality of components that are joined to the supporting foundation 105 at a proximal end and form a substantially tubular component at a distal end.

The center shaft may be coupled to a securing collar 110, and the securing collar 110 may be adapted to be coupled with at least one tree component 120a, 120b, or 120c that is elemental in the weight storage aspect of the weight tree 100. Each tree component 120a, 120b, and 120c includes at least one peg 115a, 115b, or 115c that extends outward in a manner suitable to receive and store a weight plate. At least one peg 115a, 115b, or 115c is rigid and substantially straight from a distal end to a proximate end. At least one peg 115a, 115b, or 115c is adapted to support at least forty-five (45) pounds of weight plates to be slidably mounted thereon. In embodiments, at least one peg, such as the peg 115a and/or the peg 115b, are sufficiently rigid and strong enough to support a plurality of forty-five (45) and/or one hundred (100) pound weight plates. This sufficient strength and rigidity implies the sufficient strength and rigidity of the remaining components to which a peg 115a and/or 115b is coupled, such as the respective tree component 120a, 120b and the supporting foundation 105. In various embodiments, at least one tree component 120a, 120b, or 120c is rotatable about a vertical axis (e.g., a vertical axis defined by the center shaft). In various embodiments, the at least one tree component 120a, 120b, or 120c may rotate in unison with the center shaft (as the center shaft may rotate as the coupling with the supporting foundation). Thus, a tree component 120a, 120b, or 120c having a plurality of pegs 115a, 115b, or 115c may be rotated by a user so that a user may retrieve a weight plate not immediately conveniently accessible to the user on the weight tree 100. This rotational arrangement may save appreciable space in a fitness facility because weights stored on the weight tree 100 may be accessible even when the weight tree 100 is located in a corner or near a wall. In addition, this arrangement may prevent unnecessary transport of a weight from an inconvenient location on the weight tree to the device/bar being used for weightlifting thus decreasing the likelihood of injury during movement of the weights. In an embodiment, one or more tree components 120a, 120b, and 120c may include or may be coupled with a braking mechanism, such as a centrifugal brake, coupled to prevent fast (and potentially unsafe) spinning of the one or more tree components 120a, 120b, and 120c.

Rotation of a tree component 120 may generate centrifugal force that is sufficient to dislodge a weight plate from a peg 115a, 115b, or 115c on which the plate is stored, particularly where a peg is horizontal. Therefore, one or more pegs of a tree component 120a, 120b, or 120c may feature an upward angle (see peg 115c) to prevent a weight plate from being displaced during rotation of tree component 120c. According to various embodiments, different pegs of different tree components may feature different angles. For example, a lower tree component 120a may include a peg 115a that is upwardly angled at between two (2) and ten (10) degrees, whereas an upper tree component 120c may include a peg 115c that is upwardly angled at between fifteen (15) and fifty (50) degrees.

Alternatively, or in addition, a peg, such as a peg 115b, may include a protective end 116b at the distal end of the peg 115b. A protective end may be one of various shapes to fit through the central hole of a weight plate, such as weight plate 130. In various embodiments, a protective end may be of a different material than the peg with which the protective end is coupled—e.g., the protective end 116b may be rubber or plastic and adapted to couple with the distal end of the peg 115b. In another embodiment, a peg may be fabricated with a protective end, and therefore the protective end would be integral with and of the same material (e.g., steel, titanium, etc.) as the peg.

In FIG. 1, a protective end 116a, 116b is illustrated as non-circular (substantially ovular) such that the upper portion of a protective end 116a, 116b forms a lip along the upper portion of a peg 115a, 115b, but there is not a lip or extended portion along the side or bottom of the peg. In such an embodiment, a user may angle plate 130 (as shown in FIG. 1) to place the center hole over the lip of a protective end 116b and then rotate the plate 130 until it is lined-up (coaxial) with the peg 115b, and then the weight plate 130 may be slid along the peg 115b for storage. A similar operation may be performed in reverse to remove weight plate 130 for use.

In many embodiments, a tree component 220 may include a protective stop 117a, 117b, or 117c coupled to a peg. A protective stop may limit the disposition of a weight plate on a peg. Therefore, a protective stop may be greater than a size of a center opening of the weight plate 130—e.g., a circular protective stop may have a diameter that is greater than two (2) inches. In embodiments, a weight plate 130 may be stored on a peg 115b of the tree component 220b, and the protective stop 117b may prevent the weight plate 130 from becoming positioned near the point the peg 115b is coupled with the tree component 120b. This arrangement may prevent damage to the securing collar 110 and/or may improve the accessible of the weight plate 130 because a user may be able to firmly grasp his or her hands around the edges of the weight plate 130. A peg may be fabricated with a protective stop, and therefore the protective stop would be integral with and of the same material (e.g., steel, titanium, etc.) as the peg.

In various embodiments, the weight tree 100 includes a plurality of tree components 120a, 120b, and 120c. To form the tiered tree structure, the center shaft may extend through these tree components 120a, 120b, and 120c. In embodiments, a lower tree component 120a may be coupled at a distal end with a proximal end of a securing collar 110, a distal end of the securing collar 110 may be coupled with a proximal end of a middle tree component 120b, and a distal end of the middle tree component 120b may be coupled with a proximal end of an upper tree component 120c. In such arrangements, the center shaft may extend up from the supporting foundation 105 and into the tree components 120a, 120b, and 120c, and the securing collar 110 to define the vertical axis about which the components 110 and 120a, 120b, and 120c rotate. In embodiments, the center shaft may rotate at a point of coupling with the supporting foundation 105 and, therefore, the tree components 120a, 120b, and 120c, and the securing collar 110 may rotate in unison with the center shaft. For example, force applied by a user to a peg 115b may cause the middle tree component 120b to rotate, as well as the securing collar 110 to which the middle tree component 120b is coupled and the center shaft to which the securing collar 110 is coupled. It should be appreciated that the arrangement of components of FIG. 1 is merely illustrative and is not intended to be limiting; greater or fewer tree components may be included in the weight tree 100 without departing from the spirit of the invention.

Generally, weight plates have a uniform center opening with which to engage a barbell or weight tree similar to the weight tree 100. For example, Olympic weight plates typically feature a center opening that is approximately two (2) inches in diameter, whereas "standard" weight plates have center openings approximately between one (1) and one and one-tenth (1.1) inches in diameter. Depending on the embodiment, one or more pegs and/or protective ends of the weight tree 100 may be adapted to accommodate one or both of a "standard" weight plate and an Olympic weight plate and, accordingly, may be approximately slightly less than one (1) inch in diameter—e.g., $^{31}/_{32}$ inches. In one embodiment, a peg and/or protective end of the weight tree 100 may be suitable to only accommodate an Olympic weight plate and, accordingly, may be approximately slightly less than two (2) inches in diameter—e.g., $1^{31}/_{32}$ inches. In a third embodiment, a peg and/or a protective end may be appreciably smaller than the center opening of an Olympic weight plate, but greater than the opening of a standard weight plate.

Further with respect to the dimensions of weight plates, both Olympic and "standard" weight plates typically feature varying dimensions that are somewhat proportional to the weight of each plate—for example, a forty-five (45) pound plate typically has a wider diameter than a twenty-five (25) pound plate, and an Olympic weight plate of forty-five (45) pounds or one hundred (100) pounds typically has a diameter of approximately 17.7 inches. Accordingly, a first set of pegs 115a of a first tree component 120a may be spaced apart from a second set of pegs 115b of a second tree component 120b in such a way that weight plates of various sizes may be simultaneously stored at both the first and second tree components 120a and 120b. Further, this spacing arrangement should be sufficient so that a user may remove a weight plate from a peg 115b of the second tree component 120b without obstruction from another weight plate stored at a peg 115a of the first tree component. In such embodiments, a 45-pound and/or 100-pound weight plate may be stored on a peg 115b of a middle tree component 120b without obstructing other weight plates stored on a peg 115a of a lower tree component 120a and/or stored on a peg 115c of an upper tree component 120c.

In various embodiments, a first tree component 120b may be positioned so that one or more pegs 115b of the first tree component 120b are approximately twenty-five (25) to fifty-five (55) inches from a ground surface. In connection with this configuration of the first tree component 120b, a second tree component 120a may be adequately spaced from the first tree component 120b by a distance that allows a peg 115b of the first tree component 120b to accommodate an Olympic and/or "standard" weight plate 130 of approximately forty-five (45) pounds while a peg 115a of the second tree component 120a simultaneously accommodates an Olympic and/or "standard" weight plate (not shown) of equal or lesser diameter than the first weight plate 130. In such an arrangement, the first peg 115b may be spaced from the second peg 115a by an amount that allows the Olympic and/or "standard" weight plate 130 of approximately forty-five (45) pounds or one hundred (100) pounds stored at the first peg 115b to pass over, without obstruction or interference, the other weight plate (not shown) stored at the second peg 115a during rotation of the first tree component 120b and/or the second tree component 120a. For example, one or more pegs 115b of the first tree component 120b may be spaced apart from one or more pegs 115a of the second tree component 120a by greater than approximately nine (9) inches (although a spacing of greater than approximately seventeen (17) inches may be required to simultaneously store weight plates of approximately forty-five (45) pounds or one hundred (100) at both the first and second tree components 120a and 120b). Various embodiments described herein with respect to spacing may be implemented with respect to tree components 120 located both above (e.g., tree component 120c) and below (e.g., tree component 120a) another tree component (e.g., tree component 120b).

Typical weight trees are arranged to accommodate the largest weights (generally a 45-pound or 100-pound plate) on the lowest pegs. This arrangement requires a user to bend over to lift the large plate off the peg and raise the weight to a comfortable position to walk and transport the weight to a bar/machine for use. These motions increase the risk of injury, especially to the back of the user. In the arrangement noted above and shown in FIG. 1, the largest/heaviest weight plates are placed above smaller/lighter weights (e.g., 25-pound and/or 35-pound weight plates). The largest/heaviest weights may thus be placed at a comfortable standing height for a user, permitting the user to pull the weight from the tree and place the weight on a device/bar without bending over. This arrangement substantially reduces the risk of injury.

Figure 2:
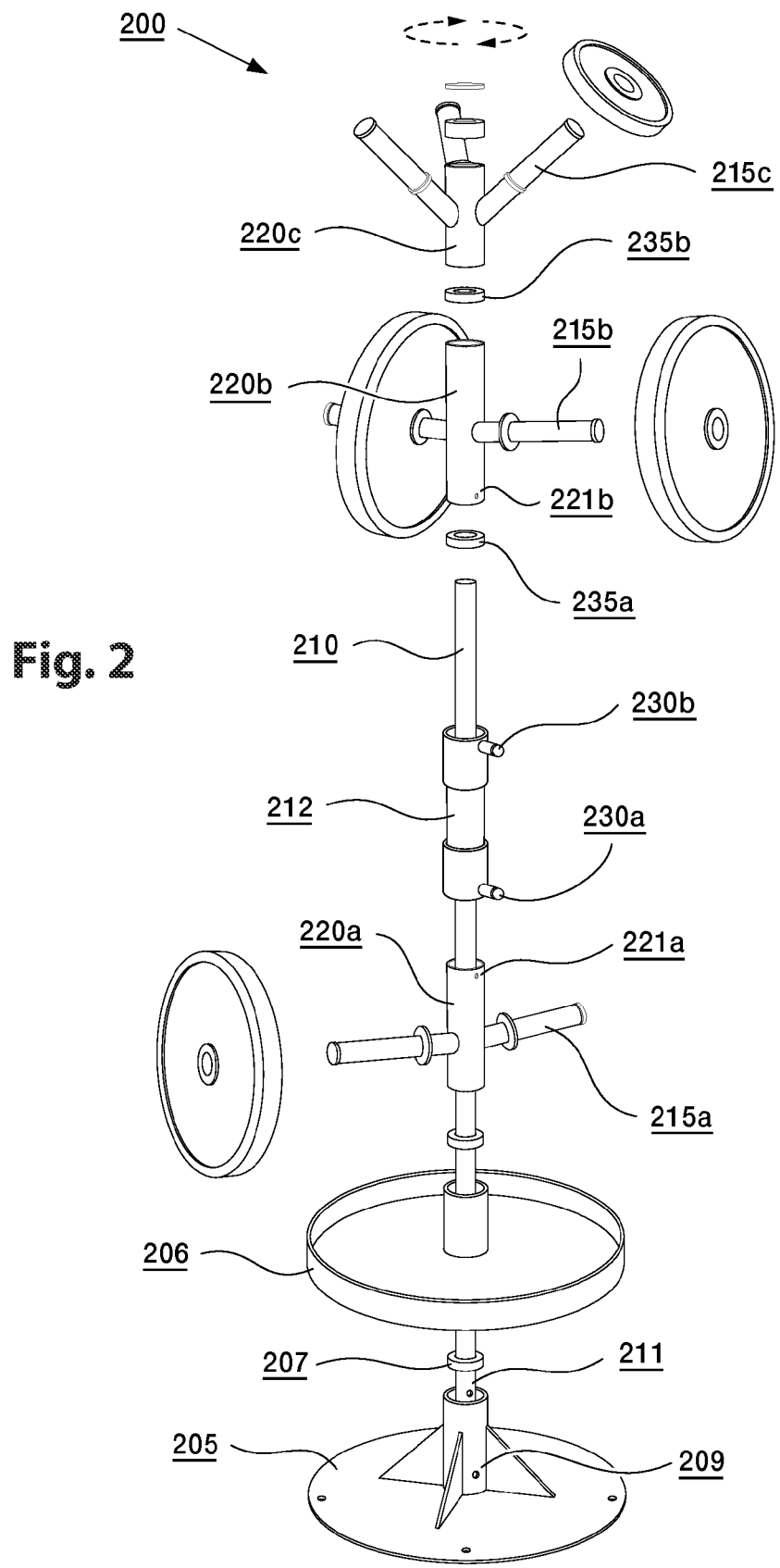
FIG. 2 is an exploded view of a weight tree for storing weight plates, according to one embodiment.

With respect to FIG. 2, an exploded perspective of a weight tree 200 for storing weight plates is illustrated, according to one embodiment. The weight tree 200 includes, but is not limited to, a supporting foundation 205, a tray 206, a center shaft 210, a securing collar 212, and a plurality of weight tree components 220a, 220b, and 220c, each including a plurality of pegs 215a, 215b, 215c extending therefrom for storing weight plates. The weight tree 200 may include features similar or the same as weight tree 100 of FIG. 1. Therefore, the supporting foundation 205 may be the same as supporting foundation 105, the tray 206 may be the same as the tray 106, the securing collar 212 may be the securing collar 110, the tree components 220a, 220b, and 220c with pegs 215a, 215b, and 215c may be the tree components 120a, 120b, and 120c with pegs 115a, 115b, and 115c, and the other illustrated components of FIG. 2 may be configured as described with respect to the components of FIG. 1.

In various embodiments, the center shaft 210 may extend into the supporting foundation 205, but may be detachable therefrom. Accordingly, the center shaft 210 may include a pin 211 adapted to engage an opening at the supporting foundation 205, such as a spring-loaded pin, a quick-release pin, or the like, to prevent center shaft 210 from rotating. Correspondingly, the supporting foundation 205 may include an opening 209 adapted to receive the pin 211.

According to some embodiments, the pin 211 may not be perpetually engaged with the opening 209. Therefore, the center shaft 210 may be adapted to rotate while coupled with the supporting foundation 205. The center shaft 210 may be coupled to a bearing 207, such as a Lazy Susan bearing, which may facilitate rotation of the center shaft while coupled with the supporting foundation 205. A bearing 207 may reduce friction and allow the center shaft 210 to easily rotate, and therefore allow the tree components 220a, 220b, and 220c to easily rotate. The center shaft 210 may include a securing collar 212. The securing collar 212 may be coupled with the center shaft 210 so that the securing collar 212 rotates in unison with the center shaft 210. The coupling between the securing collar 212 and the center shaft 210 may be substantially permanent, such as a weld or other similar fabrication technique.

As illustrated in FIG. 2, one or more of the tree components 220a, 220b, and 220c may be configured to rotate about a vertical axis, such as a vertical axis approximately through the center of the weight tree 200. A plurality of tree components 220a, 220b, and 220c may be coupled through a stacked arrangement—e.g., the center shaft 210 may extend through the components 212 and 220a, 220b, and 220c, and provide a column for the tree structure. A first tree component 220a may be coupled at a distal end with a proximal end of the securing collar 212 and rotate about a vertical axis defined by the center shaft 210, and a second tree component 220b may be coupled at a proximal end with a distal end of the securing collar 212 and rotate about a vertical axis defined by the center shaft 210.

In embodiments, a third tree component 220c may be positioned atop the center shaft 210 and rotate thereabout. A proximal end of the third tree component 220c may be coupled with or in contact with a distal end of the second tree component 220b. A distal end of the third tree component 220c may be a top of the weight tree 200. According to some embodiments, this arrangement may cause the third tree component 220c to rotate about the center shaft 210 independently of the center shaft 210 and/or the securing collar 212 and the coupled first and second tree components 220a and 220b.

In various embodiments, a first tree component 220a may be coupled with the securing collar 212 through a fastening means 230a to prevent first tree component 220a from rotating with respect to securing collar 212. Friction and/or load and/or damage resulting therefrom may be reduced between the first tree components 220a and the securing collar 212 by a separating means, such as a washer or O-ring. The fastening means 230a may be adapted to be unengaged so that the first tree component 220a may be detached from the coupling with the securing collar 212 and removed from the weight tree 200. Thus, weight tree components 220 may be used across a variety of machines and/or racks that are adapted to receive such a component. In embodiments, the fastening means 230a may be a pin, such as a pull pin, a quick-release pin, a spring-loaded pin, or the like. In such embodiments, the first tree component 220a may include an opening 221a adapted to receive the pin at the distal end. Similarly, the securing collar 212 may include a second pin fastening means 230b at the distal end adapted to engage with an opening 221b at the proximal end of the second tree component 220b. According to embodiments, this arrangement may cause the securing collar 212 and the coupled first and second tree components 220a and 220b to rotate in unison with the center shaft 210. For example, force applied by a user to a peg 215b may cause the middle tree component 220b to rotate, as well as the securing collar 212 to which the middle tree component 220b is coupled and, accordingly, the center shaft 210 to which the securing collar 212 is coupled.

As illustrated, a weight tree 200 includes a plurality of extensions or pegs 215 that may be coupled with the center shaft 210 through at least one weight tree component 220. Each peg 215 is adapted to support at least one weight plate; in many embodiments, a peg 215 may be adapted to support a minimum of forty-five (45) pounds. Because a weight tree component 220 may be configured to be rotatable about a vertical axis, the pegs 215 attached to a weight tree component 220 may be angled upward to prevent centrifugal force from dislodging a weight plate. This upward angle may vary from a few degrees (2-5 degrees, e.g., as shown by pegs 215a of a first weight tree component 220a) to an angle approximately less than forty-five (45) degrees (e.g., as shown by pegs 215c of a second weight tree component 220c).

Figure 3:
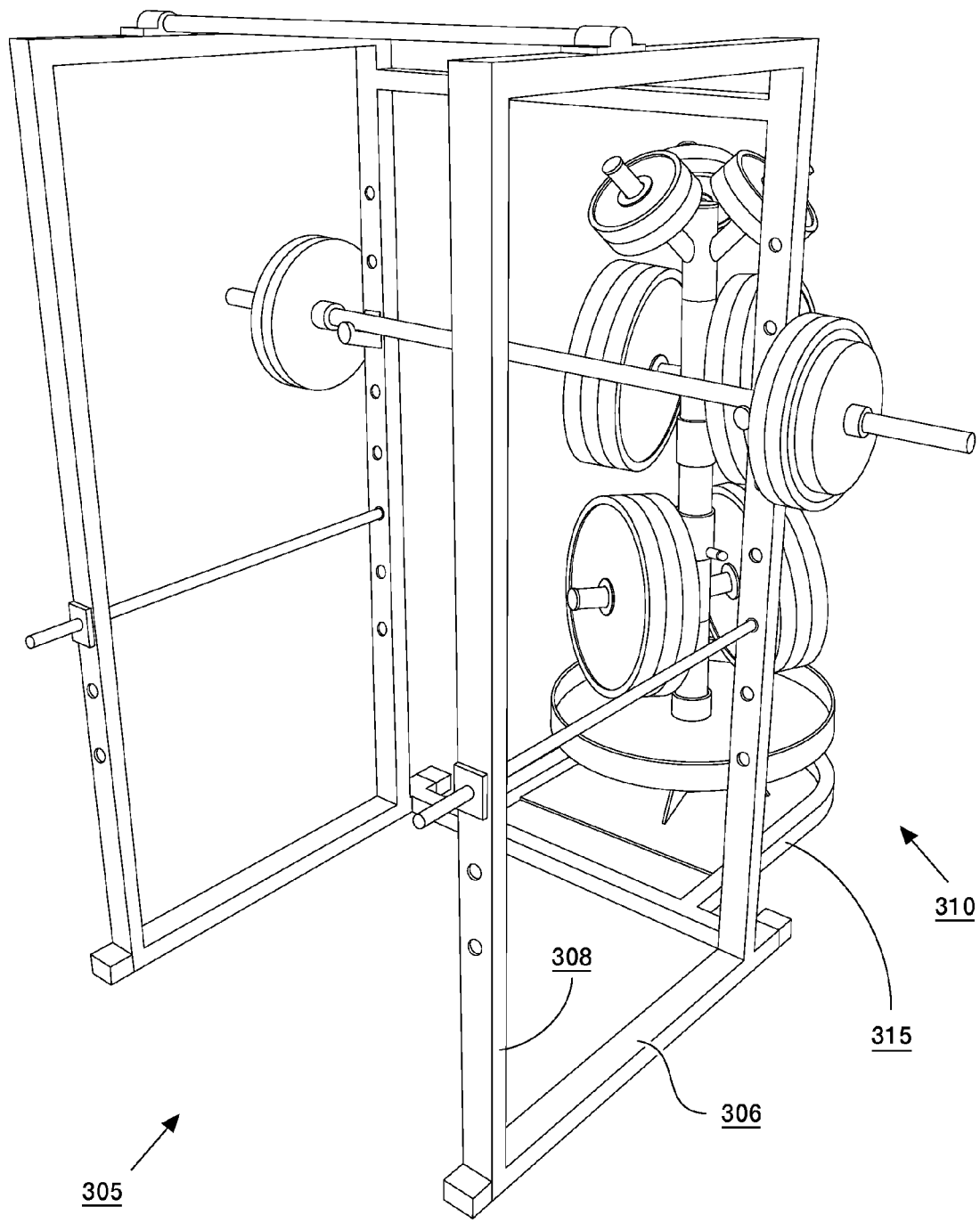
FIG. 3 is a perspective view of a weight tree for storing weights with lifting equipment, according to one embodiment.

With reference to FIG. 3, a weight tree 310 is shown coupled with a squat rack 305, according to an embodiment. In embodiments, the weight tree 310 may include arrangements and functionality similar to those described with respect to the weight trees 100 and 200 of FIGS. 1 and 2. In the illustrated embodiment, the weight tree 310 may be coupled to a squat rack 305 to, for example, facilitate the loading of a weight bar with weights. The weight tree 310 may be coupled at a base 315 of the weight tree to a base 306 of the squat rack. The squat rack 305 is illustrative and the weight tree 310 may be similarly coupled to different lifting equipment, such as a bench press, a Smith machine, a military press, and the like.

As an alternative to the embodiment illustrated in FIG. 3, the weight tree 310 may be integrated in the frame of different weightlifting equipment. Thus, the weight 310 tree may function as a support, pillar, column or the like such that the base 315 supports not only the weight tree 310, but the lifting equipment as well. For example, the weight tree 310 may be integrated into a column 308 of the squat rack 305 so that the base 306 of the squat rack 305 is coupled to the base 315 of the weight tree 310. A center shaft (not shown) of the weight tree 300 may therefore function as the column 308 to support the squat rack 305. In another embodiment, the base 306 of the lifting equipment provides a base for the weight tree 310. In such an embodiment, a vertical center shaft of the weight tree 310 may be coupled to the base 306 of the lifting equipment.

Thus, a weight tree for storing weights has been described.

In the foregoing Specification, various embodiments have been described with reference to specific exemplary embodiments thereof. It will be evident that various modifications can be made thereto without departing from the broader spirit and scope as set forth in the following claims. The Specification and drawings are, accordingly, to be regarded in an illustrative sense rather than a restrictive sense.

What is claimed is:

1. A weight tree for storing weight plates, the weight tree comprising:
  a supporting foundation, adapted to stabilize the weight tree on a surface;
  a center shaft coupled with the supporting foundation, the center shaft vertically projecting from the supporting foundation and defining a central axis;
  a first weight storage element coupled with the center shaft and adapted to rotate with or about the center shaft, the first weight storage element including a first plurality of rigid and straight pegs outwardly extending therefrom, radially from the central axis, and adapted to accommodate at least one weight plate, wherein the first weight storage element is adapted to support at least forty-five pounds of weight plates to be slidably mounted on each rigid and straight peg, and wherein the first plurality of pegs outwardly extend from the first weight storage element at an upward angle;

a plurality of protective stops, a first protective stop coupled proximate to a proximal end of a respective peg of the first plurality of pegs, the first protective stop sized to restrict inward movement of the weight plate along the respective peg prior to the weight plate reaching the center shaft; and a brake to reduce speed of rotation of the first weight storage element.

2. The weight tree of claim 1, wherein at least one of the supporting foundation, the center shaft, and the first weight storage element is constructed from at least one of steel, stainless steel, aluminum, and titanium.

3. The weight tree of claim 1, further comprising:
a second weight storage element coupled with the center shaft and adapted to rotate with or about the center shaft, the second weight storage element including a second plurality of pegs outwardly extending therefrom and adapted to accommodate at least one weight plate; and
a third weight storage element rotatably coupled with the center shaft and adapted to rotate about the center shaft, the third weight storage element including a third plurality of pegs outwardly extending therefrom and adapted to accommodate at least one weight plate.

4. The weight tree of claim 3, wherein respective proximal ends of the second plurality of pegs are spaced from respective proximal ends of both the first and third plurality of pegs by at least nine (9) inches, so that a plurality of weight plates can be stored at both the first, second, and third pluralities of pegs without interfering with one another.

5. The weight tree of claim 3, wherein each of the weight storage elements is detachably removable from the weight tree.

6. The weight tree of claim 3, wherein the first and second weight storage elements each include respective openings to receive a pin of a spring-loaded pull pin, and the weight tree further comprising:
a securing collar, coupled with the center shaft, that includes a plurality of spring-loaded pull pins, a first spring-loaded pull pin to attach the first weight storage element to the securing collar when the first spring-loaded pull pin is engaged with the opening of the first weight storage element and a second spring-loaded pull pin to attach the second weight storage element to the securing collar when the second spring-loaded pull pin is engaged with the opening of the second weight storage element.

7. The weight tree of claim 3, wherein the third weight storage element is adapted to be positioned at a distal end of the center shaft.

8. The weight tree of claim 1, further comprising:
a Lazy Susan bearing coupled with the center shaft and the supporting foundation to allow rotation of the center shaft at the coupling with the supporting foundation.

9. The weight tree of claim 1, wherein the first plurality of pegs extend at an upward angle of between two (2) and ten (10) degrees.

10. The weight tree of claim 1, wherein each peg of the first plurality of pegs comprises a single substantially tubular shaft with a diameter of approximately less than two (2) inches.

11. The weight tree of claim 1, wherein the supporting foundation is adapted to be bolted to a ground surface.

12. The weight tree of claim 1, further comprising a plurality of protective ends, a first protective end coupled to a distal end of a respective peg of the first plurality of pegs, the first protective end sized to fit through a center hole of the weight plate and configured to restrict outward displacement of the weight plate from the respective peg.

13. A weight tree for storing weight plates, the weight tree comprising:
a vertically oriented center shaft defining a central axis;
a first weight storage element coupled with the center shaft and adapted to rotate with or about the center shaft, the first weight storage element including a first plurality of rigid and straight pegs outwardly extending therefrom, radially from the central axis, and adapted to accommodate at least one weight plate, wherein the first weight storage element includes an opening to receive a spring-loaded pull pin;
a securing collar, coupled with the center shaft, that includes the spring-loaded pull pin to attach the first weight storage element to the securing collar when the spring-loaded pull pin is engaged with the opening of the first weight storage element;
a plurality of protective stops, a first protective stop coupled proximate to a proximal end of a respective peg of the first plurality of pegs, the first protective stop sized to restrict inward movement of the weight plate along the respective peg prior to the weight plate reaching the center shaft; and
a brake to reduce speed of rotation of the first weight storage element.

14. The weight tree of claim 13, further comprising a plurality of protective ends, a first protective end coupled to a distal end of a respective peg of the first plurality of rigid and straight pegs, the first protective end sized to fit through a center hole of the weight plate and configured to restrict outward displacement of the weight plate from the respective peg.

* * * * *